UNITED STATES PATENT OFFICE.

WILLIAM RENATUS KLECKNER, OF BAY CITY, MICHIGAN.

FERTILIZING SCALE-POISON.

1,003,273. Specification of Letters Patent. Patented Sept. 12, 1911.

No Drawing. Application filed June 4, 1910. Serial No. 564,931.

*To all whom it may concern:*

Be it known that I, WILLIAM R. KLECKNER, a citizen of the United States, and a resident of Bay City, in the county of Bay and State of Michigan, have invented a new and Improved Fertilizing Scale-Poison, of which the following is a full, clear, and exact description.

The invention has in view a composition which when applied as hereinafter indicated, exterminates and destroys all kinds of parasitical insects infesting various parts of fruit, forest and ornamental trees or shrubs and vines, and, further, which will operate to discharge food products directly into the sap, supplying an immediate stimulation and rapid fertilization of all tissues and growing parts of trees, quickly correcting the failing activity and low vitality caused by the ravages of parasitical insects or by depleted and barren or unsatisfactory soils.

In the manufacture of the fertilizing scale poison, two mixtures are made, which, for convenience of description I will term A and B. Mixture A consists of the following according to percentages by weight: potassium cyanid 95%, phosphoric acid 5%. Second mixture consists of the following according to relative percentages by weight: ferric chlorid 45%, ferric nitrate 50%, bread crumbs (dried) 5%.

All the chemicals employed are preferably chemically pure.

In the preparation of mixture A, the potassium cyanid and phosphoric acid are ground together in a porcelain mortar or other grinding machine, to such a fineness that the entire mass passes through a sieve having fourteen meshes per inch. The pulverized material after being thoroughly mixed is transferred to dry gelatin capsules of the customary form and size known to the drug trade as "double naught," these capsules having a capacity when filled with mixture A, of 1.5 grams.

In the preparation of mixture B, the ferric chlorid, ferric nitrate and bread crumbs in the proportions as above indicated, are ground together in the same manner and to the same fineness and thoroughly mixed. This mixture is then placed into gelatin capsules of size double naught, which capsules when filled with mixture B hold approximately 1.3 grams.

In the application of mixtures A and B, constituting the fertilizing scale poison, to the tree, shrub or vine, the two mixtures are inserted under the bark of the tree after being removed from the capsules. This may be done by making a transverse cut into the bark of the tree about one-half inch long with any suitable instrument, such as a pocket knife, and from each extremity of this transverse cut making a longitudinal incision downward about one inch long. This section of bark, cut on three sides as indicated, is then bent out and the two gelatin capsules, with caps removed, containing mixtures A and B respectively, are placed in the cavity thus formed. After the contents of the two capsules, that is both mixtures, have been inserted into the tree, the lip of the bark is bent back and tightly pressed to place. The entire section of the bark is afterward covered with a grafting wax, which completes the method of application.

The second method consists in taking the two capsules containing the mixtures A and B, and dissolving the same in one ounce of cold water. Chemical action at once ensues, and the resulting solution is in readiness for immediate application.

A curved and elastic steel or iron wire one-eighth of an inch in diameter and of convenient length, is thrust into the bark and pushed half way around the branch or trunk between the bark and wood and then withdrawn. The channel under the bark thus formed is then filled with the water solution of fertilizing scale poison as above prepared, the injection of the fluid into the channel under the bark being made ordinarily by the use of a syringe having a long narrow nozzle. After the nozzle is removed from the entrance of the channel, the latter is then closed with the grafting wax, which completes this method of application.

The application of the compound should be made at a point about the trunk of the tree in such a manner that the compound is embedded a little below the angle of the spreading branches, to insure perfect distribution.

The most advantageous time of application is during the early spring at a time when the leaves are just breaking forth and the sap has well started to flow. Application, however, can be made at any time that conditions may warrant, until the fruit has matured. The action of the compound is as follows: The space in the bark containing the capsules filled with fertilizing scale poison, or channel under the bark containing a solution of the same, is rapidly filled with sap. Sap normally contains approximately 90% water, and readily dissolves the inclosed compound or its solution. The insecticidal and fertilizing value of the compound depends on the chemical combination of the potassium cyanid and the combined ferric chlorid and ferric nitrate, producing hydro-cyanic acid in a free state with potassium chlorid, potassium nitrate and ferric hydroxid as resulting products. It is evident that water is the starting point of this complete reaction, and, hence, the sap affords an efficient reagent to start and complete the desired chemical combination.

The insecticidal element is the free and active hydra-cyanic acid, which is readily soluble in all proportions in water, and, hence, is carried to all parts of the tree by the flow of the sap. In the course of the distribution of the poisoned sap, all parasitical insects that suck out and extract the soluble food materials from the sap are immediately killed. Again, the odor of hydro-cyanic acid emitted from the dead body of a scale insect for instance, even kills the unhatched eggs concealed under the protective covering of the insect. In this manner the fertilizing scale poison is adapted to completely, quickly and permanently exterminate all forms of suctorial parasitical insects that may infest the bark, leaves, flowers or fruit. The insecticidal value of the composition extends to all forms of bugs, beetles, worms, fungi; as well as to both armored and naked scale insects and their eggs.

Hydro-cyanic acid although violently poisonous even in minute quantities, is in no way detrimental to any part of the tree, nor does it interfere with any of the normal functions of the sap, and in no event is it retained within the fruit. Any hydro-cyanic acid retained in the bark or tissues of young branches is perfectly harmless to those parts, as is evidenced by the fact that hydro-cyanic acid compounds are often found and formed in those parts during the natural course of growth, without any application of any character. Hydro-cyanic acid entering the leaf is rapidly decomposed by the carbon dioxid of the air, into formic acid and ammonia, both of which are in no way harmful. Hydro-cyanic acid entering the fruit in the presence of such organic acids, always present, as malic, citric, acetic, racemic, tartaric, succinic, tannic and other acids, is rapidly decomposed into ammonium formate or double cyanids, which are perfectly neutralized and in some mysterious manner always find their way into the kernels and seeds of the fruit. Under normal and natural conditions the seeds and kernels of all fruits contain these very compounds of hydro-cyanic acid. Hence, the seeds and kernels serve as the receptacles for any excess that may find its way into the flower or fruit.

Phosphoric acid is added to serve as a plant food, to stimulate growth of tender tissues and replenish young cells with the very element that the nuclei require for the purpose of propagation. Scale insects in particular absorb such a large amount of the phosphorous compounds, that infested trees naturally suffer from want of this particular food. Again, the nucleus of each individual cell is directly dependent upon its phosphoric acid to perform its various functions properly, and since the nucleus is the most highly specialized and controlling center of vitality it is a most important stimulant. Phosphoric acid must be well supplied, otherwise the tree will be subject to slow growth and bear fruit of inferior quality. A generous supply of phosphoric acid promotes the formation of chloroplastids and chlorophyll, and figures prominently in the transformation of starches into sugars during the fruiting season.

Potassium chlorid and potassium nitrate formed in sap are important plant foods, and since they are readily soluble are quickly distributed to the desired points. These two elements promote turgescence or root pressure, improving the absorbing powers of trees, and in the transformation of starches into sugars, stimulate the formation of protein and related nitrogenous compounds, and enhance the brilliancy of fruit colors.

The bread crumbs added to mixture B serve simply as a diluent and desiccating agent to keep the mixture dry, since both ferric chlorid and ferric nitrate absorb moisture very greedily. The ferric hydroxid precipitated in sap during the chemical combination of the several constituents of the compound, remains as an insoluble sludge at first, but is gradually absorbed and dissolved by the sap, although very slowly. Ferric hydroxid is so plentifully found in all soils that its value is not great, but nevertheless quickly corrects an unbalanced condition of sap that may require it, and promotes the formation of cellular tissues and chlorophyll, the green coloring matter of all trees.

Having thus described my invention, I claim as new and desire to secure by Letters Patent:

1. A fertilizing scale poison for trees, shrubs and vines, containing potassium cyanid, phosphoric acid, ferric chlorid, ferric nitrate and bread crumbs.

2. The herein described composition of matter for treating vegetation internally, which contains an alkali metal cyanid, a chlorid of the iron group, and a nitrate of the iron group.

3. A fertilizing scale poison for trees, shrubs and vines, containing an alkali metal cyanid, chlorid of iron and nitrate of iron in the presence of a desiccating agent.

4. A fertilizing scale poison for trees, shrubs and vines, containing potassium cyanid, ferric chlorid, ferric nitrate and bread crumbs.

5. A fertilizing scale poison for trees, shrubs and vines, containing a cyanid, a chlorid and a nitrate, the cyanid, the chlorid and the nitrate capable of reacting in the presence of water to produce hydrocyanic acid in a free state and a fertilizing chlorid and nitrate.

6. A fertilizing scale poison for trees, shrubs and vines, containing a soluble cyanid, chlorid, and nitrate salts of iron, said cyanid and salts reacting in the presence of water to produce hydrocyanic acid and a plant fertilizer.

7. A fertilizing scale poison for trees, shrubs and vines, containing potassium cyanid, phosphoric acid, ferric chlorid, ferric nitrate and a desiccating agent.

8. A fertilizing scale poison for trees, shrubs and vines, containing potassium cyanid, ferric chlorid and ferric nitrate, adapted to be brought together in the presence of water, to form free hydrocyanic acid.

In testimony whereof I have signed my name to this specification in the presence of two subscribing witnesses.

WILLIAM RENATUS KLECKNER.

Witnesses:
GILBERT W. HAND,
CLARA MONTAMBEAU.